(No Model.)
G. B. WARNER & L. J. ALLEN.
ROPE HOLDER.
No. 476,969. Patented June 14, 1892.
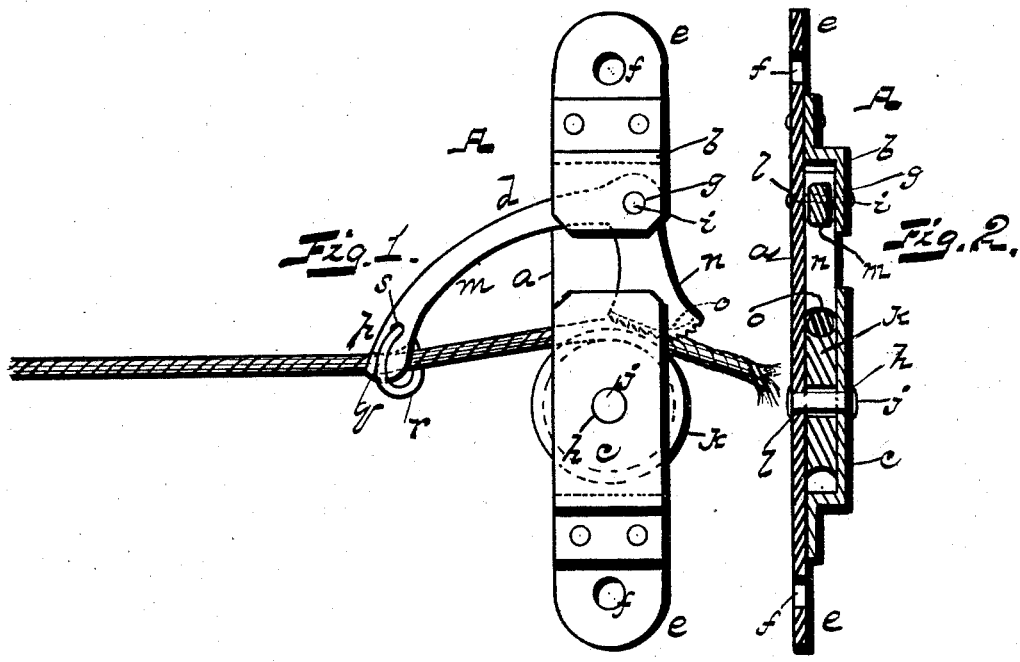
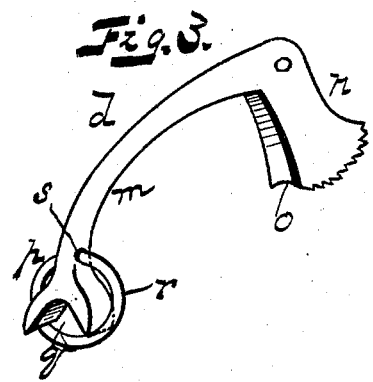

UNITED STATES PATENT OFFICE.

GEORGE B. WARNER AND LEWELLYN J. ALLEN, OF WOODBURY, CONNECTICUT.

ROPE-HOLDER.

SPECIFICATION forming part of Letters Patent No. 476,969, dated June 14, 1892.

Application filed March 3, 1892. Serial No. 423,588. (No model.)

*To all whom it may concern:*

Be it known that we, GEORGE B. WARNER and LEWELLYN J. ALLEN, citizens of the United States, residing at Woodbury, in the county of Litchfield and State of Connecticut, have invented certain new and useful Improvements in Rope-Holders; and we do hereby declare the following to be a full, clear, and exact description of the invention, such as will enable others skilled in the art to which it appertains to make and use the same.

This invention has relation to improvements in rope or line fasteners; and it consists in the novel construction, combination, and arrangement of parts, of which it is composed, whereby a line can be readily attached and detached from the device, all as will be hereinafter fully explained.

The annexed drawings, to which reference is made, fully illustrates our invention, in which—

Figure 1 represents a front or face view of our improved rope or line holder. Fig. 2 is a vertical sectional view of the same, and Fig. 3 is a perspective view of the pivoted gripping-arm detached from the plate.

Referring by letter to the accompanying drawings, A designates the line-holder consisting of a supporting-plate $a$, having angular projections or housings $b\ c$, and an angular gripping-arm $d$. The plate $a$ is constructed with upper and lower ends $e\ e$, each having a perforation $f$, whereby said plate or holder may be fastened to a post or other support by nails or screws passing through said perforations. This plate is provided with the angular housings $b\ c$, which are each perforated, as at $g\ h$, to receive the journals $i\ j$ of the grooved pulley $k$ and angular arm $d$, which journals also enter perforations $l\ l$ in the plate $a$. The angular arm $d$ consists of the lever portion $m$ and a gripping short portion or arm $n$, which latter has at its end a groove $o$, while the lever or long arm is provided at its end $p$ with a V-shaped groove $q$ and a ring or loop $r$, which is pivoted thereto by passing through a perforation $s$ in the end of said long arm or lever.

It will be readily seen by the above description and by reference to the annexed drawings that in operating our device the end of a line is passed through the loop or ring $r$, said line resting within the V-shaped groove $q$, after which said line is passed over the pulley $k$, and by means of the tension of the rope on the long arm or lever raising it and the same turning on its pivot $i$ causes the short arm $n$ to bear upon the rope, thus firmly gripping the latter between said arm and the grooved pulley. The angular plate or housing $c$ extends somewhat above the periphery of the pulley and serves as a guard for the rope and grooved end of the short arm aforesaid, thus preventing lateral displacement of said arm. At the same time the angular plate $b$ also serves a similar purpose for the angular lever. It will be further observed that when the device is in position the heavier the weight upon the line the tighter the device grips the same, and to remove the line therefrom the operator simply gives a sharp pull upon the free end of the rope and slightly raises the lever at same time, when the rope will pass free from the holder.

To tighten the line and relieve the same from slack, the operator simply draws the free end of the rope, the backward strain of the line causing the angular arm to grip the rope. The loop or ring in the end of the long arm is designed to keep the rope in position in relation to the groove in the end of said arm, and a line-holder as herein described is simple in operation, durable, and at the same time cheap to manufacture, as well as being ornamental.

Having described our invention, what we claim is—

A rope or line holder consisting of the plate having the angular housings perforated to receive the journals, the grooved pulley, and the angular lever having a groove in its end and a loop secured thereto, the same adapted to engage a rope, and a short arm thereof adapted to bear upon the rope, whereby the latter is held firmly between the same and the pulley, substantially as described.

In testimony whereof we affix our signatures in presence of two witnesses.

GEORGE B. WARNER.
LEWELLYN J. ALLEN.

Witnesses:
WILLIAM COTHREN,
ISABELLE DELANEY.